United States Patent [19]

Post et al.

[11] 4,134,594

[45] Jan. 16, 1979

[54] ANTISTATIC RECORD CLEANER

[75] Inventors: Herman D. Post, Great Neck; Edward Perper, Brooklyn, both of N.Y.

[73] Assignee: Robins Industries Corporation, Comack, N.Y.

[21] Appl. No.: 858,531

[22] Filed: Dec. 7, 1977

[51] Int. Cl.² ............................................. G11B 3/58
[52] U.S. Cl. ...................................... 274/47; 361/221
[58] Field of Search ................ 361/221, 212; 274/47, 274/1 R

[56] References Cited

U.S. PATENT DOCUMENTS 2,744,212  5/1956  Baum ...................................... 274/47

FOREIGN PATENT DOCUMENTS 2115229  10/1972  Fed. Rep. of Germany ........... 361/221

Primary Examiner—Harry N. Haroian
Attorney, Agent, or Firm—Michael J. Striker

[57] ABSTRACT

An antistatic record cleaner has a support securable to a turntable adjacent the platter thereof and having an upward metallic pin having an upper end projecting from the support. A sweep arm is pivoted on the support and has a metallic rod whose inner end is secured in a pivot-forming block which is formed with a recess receiving the upper end of the pivot with metal-to-metal contact between the rod and the pin and has on its outer end a head piece carying a record-sweeping brush. A plurality of fine metallic filaments extend downwardly from and are in direct electrical contact with the outer end of the rod. A terminal is provided on the support in direct electrical contact with the pin and through the rod with the filaments. This terminal can be grounded via a lead so that static electric charges on the record being swept can be eliminated.

10 Claims, 1 Drawing Figure

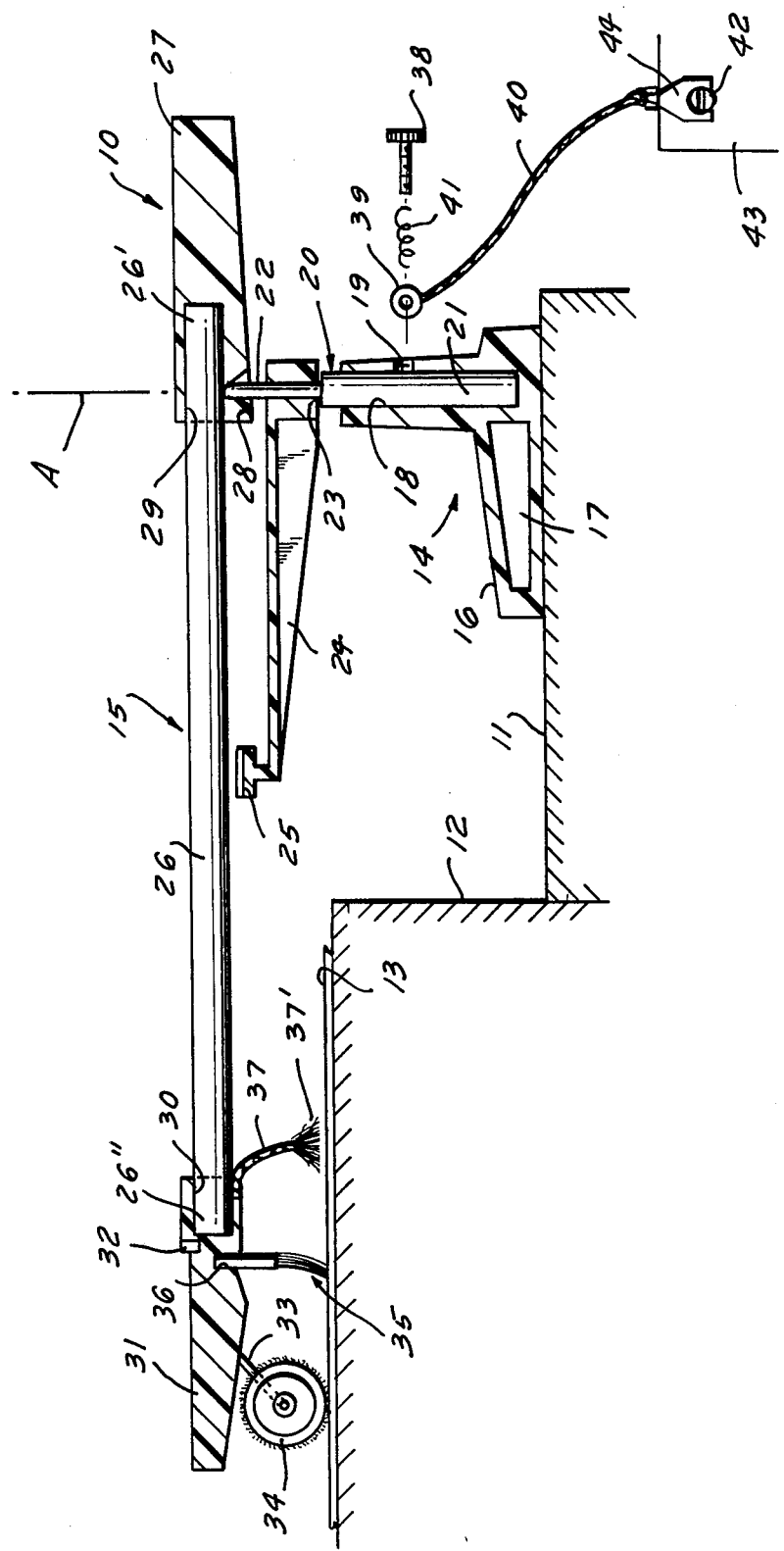

ANTISTATIC RECORD CLEANER

BACKGROUND OF THE INVENTION

The present invention relates to a record cleaner. More particularly this invention concerns a turntable attachment which sweeps dust from the grooves of a record and discharges any static-electricity charge on the record.

An automatic record cleaner is known, such as sold under the trademark "Groovee" of the assignee of this application, which can be mounted on a turntable adjacent the platter thereof so as to automatically sweep the surface of a record being rotated by the turntable platter as it is played. The device basically comprises a support about which an arm is pivotal about an upright axis with limited rocking ability. The outer end of this arm has a head provided with a sweep brush and a velvet cleaning roller that engage the grooves of a record to be swept. As the record rotates the device automatically tracks the grooves and swings inwardly so as to clean the surface of the record ahead of the pickup stylus. Such an arrangement functions admirably for sweeping dust from the grooves of a record, but all alone does not discharge any static-electric charge on the record being cleaned.

It has been suggested to provide some means on such a device for discharging any static-electric charge on the record ahead of the pickup stylus, so as to eliminate static charges that would cause dust to adhere to the record and create spurious noise. Attempts at providing such an arrangement have, however, resulted in a considerable increase in production costs of the record cleaner, and have often impaired the operation of the record cleaner by necessitating a wire extending past the pivot to ground. Furthermore such arrangements make it difficult to lift off the cleaning arm of such a record cleaner for cleaning or replacement of the brush and/or roller thereof.

SUMMARY OF THE INVENTION

It is therefore an object of the present invention to provide an improved antistatic record cleaner.

Another object is to provide such a record cleaner which effectively discharges any static electricity on the record as it is being cleaned, but which at the same time does not appreciably increase production costs of the record cleaner or make its operation or servicing more difficult.

These objects are attained according to the present invention in an antistatic record cleaner of the above-described general type but wherein the arm is constituted as a metallic rod having a pivot forming block on its inner end which is formed with a recess receiving the upper end of a metallic pivot pin carried on the support of the cleaner. The outer end of this metallic rod carries a plurality of fine metallic filaments which extend downwardly toward the record but which are in direct electrical contact with the rod at the outer end thereof. A terminal is provided on the support in direct electrical contact with the pivot pin which itself is in direct metal-to-metal contact with the rod of the arm at the recess formed in the pivot block thereof. Thus a continuous ground path is formed extending from the filaments to the rod and then at the contact point with the pin to this pivot pin, and finally to the terminal of the support engaging the pivot pin. Means including a lead or the like is provided for connecting this terminal to a suitable ground such as the grounded chassis of associated electrical equipment, a water pipe, or the like.

Thus with the system according to the present invention the structure of the arm itself is used as the conductive ground path. No wire need extend around the pivot between the arm and the support, since a direct electrical contact is formed between the metallic pivot pin and the metallic rod of the arm. Thus the arm can be lifted off for servicing without having to disconnect the ground thereof.

According to further features of this invention the pivot pin is vertically displaceable in the support for height adjustment of the cleaning device. A screw threaded into the support is engageable with this pin to lock it in any of a plurality of vertically offset positions, and this screw also serves as the above-mentioned terminal for connection to ground.

The outer end of the rod is force-fitted into a head piece carrying the nylon sweep brush and the velvet-covered roller. Braided or stranded copper wire is simply force-fitted into the hole in the head piece that receives the outer end of the rod so that this braid or stranded wire hangs down in back of the head piece. The braid can brush lightly, cat-whisker fashion, on the record, or can merely be closely juxtaposed with the upper surface thereof. It has been discovered that even without direct contact between the filaments and the record it is possible, in the manner of a ground plane, for the filaments to discharge static electricity on the record surface.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The sole FIGURE of the drawing is a partly exploded and schematic side view illustrating the apparatus according to this invention.

DESCRIPTION OF A PREFERRED EMBODIMENT

As shown in the drawing a record cleaner 10 is adapted to be mounted on a turntable 11 adjacent the platter 12 thereof on which is supported a record 13. The cleaner 10 basically comprises a pivot/support 14 on which a cleaning arm 15 can pivot about an upright axis A.

The support 14 is constituted as a synthetic-resin body 16 having a flat lower surface and provided internally with a weight 17. This body 16 is formed on the axis A with an upwardly open blind cylindrical hole 18 and with a radially open threaded hole 19 opening into this hole 18. In addition the body 16 is split so that it can be deformed somewhat at the hole 18. A chrome-plated pivot pin 20 has a large-diameter lower portion 21 snugly received in the hole 18 and a small-diameter upper portion 22 separated from the lower portion at a shoulder 23. The portions 21 and 22 are centered on the axis A. An armrest 24 is snugly fitted on the upper portion 22 and rests on the shoulder 23. This armrest 21 has an upwardly concave outer end 25 on which the arm 15 can snugly sit.

The arm 15 itself basically comprises a tubular or solid plated brass tube or rod 26 having a rear or inner end 26' and a front or outer end 26". A synthetic-resin pivot block 27 is formed with a downwardly flared slot 28 that opens into a cylindrical bore 29 that snugly receives the rear end 26'. The slot 28 is of constant width parallel to the axis of the tube 26 and is only flared on the sides indicated in the drawing. The pivot block 27 acts as a counterweight.

The front or outer end 26" of the rod 26 is snugly received in a cylindrical blind bore 30 formed at the rear end of a head piece 31 made of synthetic resin like the elements 16, 21 and 27. This head piece 31 has a laterally extending pickup arm 32 and pivotally carries a wire 33 extending through the center of a velvet-covered roller 34 which normally does not rotate on the wire 33, but which can be forcibly rotated on this wire 33 if desired. The head piece 31 also carries behind the roller 34 a small nylon brush 35 snugly received in a downwardly open bore 36 in the head piece 31.

In use the roller 34 and brush 35 rest on the upper surface of the record 13 which is rotated by the platter 12 of the turntable. Dust and the like on this record 13 are therefore picked up by the roller 34 and brush 35 so that such dust does not interfere with the tone quality.

In addition according to this invention a copper stranded wire or braid 37 has one end force-fitted into the hole 30 with the front end 26" of the rod 26 so as to be in good electrical contact with this rod 26. The stranded wire 37 extends downwardly toward the record 13 and has a brush-like lower end 37'. The braid or wire 37 may be insulated except at its end in the bore 30 and its lower end 37', or may simply be a small piece of braid made of fine copper-wire strands. A knurled screw 38 is threaded into the bore 19 so that it directly engages the lower portion 21 of the pivot pin 20. An eye 39 carried on one end of a ground lead 40 constituted as a braided cable is in good electrical contact with the screw 38, being held snugly in place by a small compression spring 41 engaged between the head of the screw 38 and the eye 39. The other end of the ground lead 40 carries a spade lug 44 which is connected via a screw 42 to a suitable ground 43 which may be the chassis of a piece of well-grounded electrical equipment or may be a radiator, water pipe, or the like.

Thus, as the roller 34 and brush 35 are sweeping dust from the record the lower end 37' will either ride lightly on or be positioned a fraction of a millimeter above the surface of the record 13. Any static charge on the record 13 will therefore be discharged through the ground path extending from the lower end 37' of the braid 38 back through the tube 26, then across the metal-to-metal contact region between the upper end of the pivot pin 20 and the rear end of the rod 26, and thence via the screw 38 and ground lead 40 to the ground 43. For servicing the entire arm 15 can be easily lifted off the upper portion 22 of the pin 20.

Such an arrangement can be produced at very low cost, indeed equipping a record cleaning device with the static ground only slightly increases its production cost. At the same time, however, the device automatically eliminates any static charge on the record surface so that the use of special antistatic liquids and the like can be largely eliminated.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An antistatic record cleaner, comprising a support that can be secured to a turntable adjacent the platter thereof; a metallic pivot pin, one end of which is attached to said support; a pivot block formed with a recess in which said pivot pin is engageable; a metallic rod having an inner end contained within said pivot block, said inner end being exposed in said recess and directly engaging said pin, said pin and the metal-to-metal contact between said pin and said rod forming a continuous ground path from said inner end of said rod to said support; means on said support for connecting said ground path to a ground adjacent said support; and a filament extending downward from an outer end of said rod, one end of said filament being in electrical contact with said rod, the other end of said filament being engageable with a record on said platter.

2. The antistatic record cleaner defined in claim 1, further comprising a brush on said outer end engageable with a record on said platter.

3. The antistatic record cleaner defined in claim 1 wherein said rod has on its said outer end a head piece carrying said brush.

4. The antistatic record cleaner defined in claim 1 wherein said pin is vertically displaceable in said support and arrestable in any of a plurality of vertically offset positions therein.

5. The antistatic record cleaner defined in claim 1 wherein said means for connecting includes a screw threaded into said support and directly engaging said pin.

6. The antistatic record cleaner defined in claim 5 wherein said means for connecting includes a conductive lead connected to said screw.

7. The antistatic record cleaner defined in claim 1 wherein said outer end has a plurality of such filaments extending brush-fashion downwardly.

8. The antistatic record cleaner defined in claim 2, wherein said filament has such a length that when said brush rests on said record said other end of said filament is spaced from said record.

9. A record cleaner comprising:
a support securable to a turntable adjacent the platter thereof;
an upright metallic pin having an upper end projecting from said support;
an arm having
a metallic rod having an inner and an outer end,
a pivot-forming block on said inner end formed with a recess receiving said upper end of said pin with metal-to-metal contact at said recess between said rod and said pin, and
a head piece on said outer end of said rod;
a plurality of fine metallic filaments extending downwardly from and in direct electrical contact with said outer end of said rod;
a brush on said head piece engageable with the upper surface of a record on said platter;
a terminal on said support in direct electrical contact with said pin, and through said rod with said filaments; and
means including a lead for connecting said terminal to a ground.

10. The antistatic record cleaner defined in claim 9 wherein said filament has such a length that when said head is supported by said brush on said record said filament has a lower end spaced from said record.

* * * * *